United States Patent
Jayawardena et al.

(10) Patent No.: US 8,254,257 B2
(45) Date of Patent: Aug. 28, 2012

(54) SYSTEM AND METHOD FOR LOCATION, TIME-OF-DAY, AND QUALITY-OF-SERVICE BASED PRIORITIZED ACCESS CONTROL

(75) Inventors: Thusitha Jayawardena, Holmdel, NJ (US); Gustavo de los Reyes, Fair Haven, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 342 days.

(21) Appl. No.: 12/636,198

(22) Filed: Dec. 11, 2009

(65) Prior Publication Data

US 2011/0141900 A1   Jun. 16, 2011

(51) Int. Cl.
 G06F 11/00 (2006.01)
 G06F 15/173 (2006.01)
 H04L 12/66 (2006.01)
 H04L 12/56 (2006.01)

(52) U.S. Cl. ......... 370/235; 370/352; 370/401; 709/223
(58) Field of Classification Search .......................... None
See application file for complete search history.

(56) References Cited

U.S. PATENT DOCUMENTS

| 7,177,397 | B2 | 2/2007 | McCalmont et al. |
| 7,298,088 | B2 | 11/2007 | Iida et al. |
| 7,307,978 | B2 | 12/2007 | Carlson |
| 7,313,133 | B2 | 12/2007 | Yarlagadda |
| 7,333,480 | B1 | 2/2008 | Clarke et al. |
| 2007/0016663 | A1* | 1/2007 | Weis ............................ 709/223 |

* cited by examiner

*Primary Examiner* — Clemence Han
(74) *Attorney, Agent, or Firm* — Larson Newman, LLP

(57) ABSTRACT

A priority server for a provider network includes a traffic volume detection module, a traffic analyzer module, and a rules module. The traffic volume detection module receives operational information from the provider network and determines that a host is experiencing a flash event based upon the operational information. The traffic analyzer module determines that the flash event is not a distributed denial of service attack on the host. When it is determined that the flash event is not a distributed denial of service attack, the rules module provides a priority rule to an access router that is coupled to the host. The priority rule is based upon a characteristic of packets routed in the provider network that are associated with the flash event, and the characteristic is determined not solely by information included in the packets.

20 Claims, 3 Drawing Sheets

SYSTEM AND METHOD FOR LOCATION, TIME-OF-DAY, AND QUALITY-OF-SERVICE BASED PRIORITIZED ACCESS CONTROL

FIELD OF THE DISCLOSURE

The present disclosure generally relates to communications networks, and more particularly relates prioritized access control in a communications network.

BACKGROUND

Packet-switched networks, such as networks based on the TCP/IP protocol suite, can provide a rich array of information services to a wide variety of client applications. As the volume of information service requests in a packet-switched network changes, the forwarding behavior of the access routers in the packet-switched network can be changed to more efficiently handle the service load.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed systems, methods or computer-readable media. Moreover, some statements may apply to some inventive features but not to others.

Figure 1:
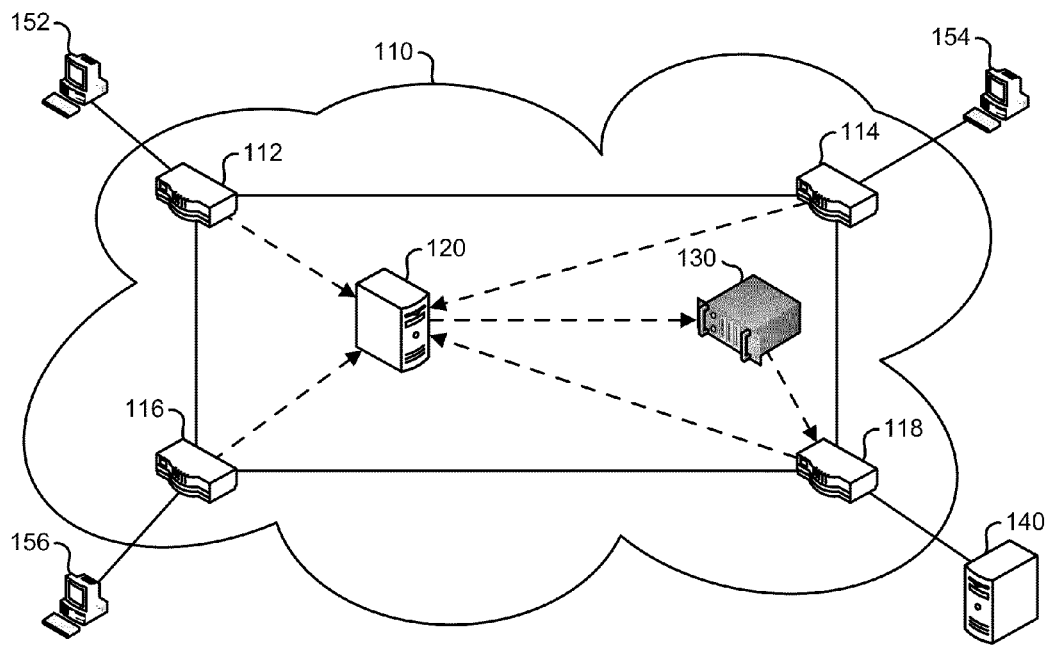
FIG. 1 is a diagram illustrating an embodiment of a communications network.

FIG. 1 shows an embodiment of a communications network 100 including a provider network 110, an Internet host 140, and independent systems 152, 154, and 156. Provider network 110 includes access routers (ARs) 112, 114, 116, and 118, a network data server 120, and a policy server 130. AR 112 is connected to independent system 152, and to ARs 114 and 116 via primary links (illustrated by solid lines). AR 114 is also connected to independent system 154 and AR 118 via primary links. AR 116 is also connected to independent system 156 and AR 118 via primary links AR 118 is connected to Internet host 140 via a primary link. In addition, ARs 112, 114, 116, and 118 are connected to network data server 120 via network data links (illustrated by dashed lines). Policy server 130 is connected to network data server 120 and AR 118 via network data links. Policy server 130 is also connected to ARs 112, 114, and 116 via network data links (not illustrated). The primary links and network data links are suitable for bi-directional communication of information between the elements of communications network 100 that are connected therewith. While the network data links are bi-directional, they are illustrated with arrowheads indicating a direction of the information flow to assist in the following description.

Provider network 110 functions to provide network routing to a group of Internet protocol (IP) addresses for communicating information via the primary links between the devices (not illustrated) located within the group of IP addresses and devices with other IP addresses, as represented by independent systems 152, 154, and 156. In particular, provider network 110 allocates one or more of the group of IP addresses to Internet host 140 such that information is communicated between Internet host 140 and independent systems 152, 154, and 156 via ARs 112, 114, 116, and 118. Internet host 140 provides content and services that are requested by independent systems 152, 154, and 156. A non-limiting example of the content and services provided by Internet host 140 includes media content, HTML content, other content, information services, application services, commercial services, other services, or a combination thereof. Particular examples can include a disaster response coordination web site, an on-line gaming community host, or an on-line store front for a retail business. Independent systems 152, 154, and 156 make requests for the content and services of Internet host 140. As such, independent systems 152, 154, and 156 can represent individual clients of provider network 110, other autonomous networks connected to provider network 110, or a combination thereof. In a particular embodiment, communications network 100 represents a public Internet, and provider network 110 represents an Internet service provider (ISP) or large organization that maintains one or more independent connection to independent systems 152, 154, and 156 on the public Internet. In another embodiment, communications network 100 represents a private internet, and provider network 110 represents a private organization that maintains one or more independent connections to other private independent systems 152, 154, and 156 on the private Internet.

Provider network 110 can also provide network routing for the other devices (not illustrated) located within provider network 110's group of IP addresses. Provider network 110 is thus adapted to provide efficient network routing based upon the flow of information there through. For example, at a particular time information flowing between independent system 152 and Internet host 140 can pass through ARs 112, 114, and 118, while at another time information flowing between independent system 152 and Internet host 140 can pass through ARs 112, 116, and 118, depending on the amount of information flowing in provider network 110 at each given time. In another example, the information flow between AR 116 and AR 118 may be so heavy that a new information flow between Internet host 140 and independent system 156 may be routed through AR 118 to AR 114, to AR 112, to AR 118, and finally to independent system 156, and vice versa.

The behavior whereby ARs 112, 114, 116, and 118 route information is determined in part by header information included in each packet of information handled by ARs 112, 114, 116, and 118. The format of the header information is determined by the communication protocol used by communications network 100. For example, communications network 100 can utilize the TCP/IP suite of communication protocols including as a non-limiting example, a transport layer protocol such as Transmission Control Protocol (TCP), User Datagram Protocol (UDP), another transport layer protocol, and an Internet layer protocol such as Internet Protocol version 4 (IPv4), Internet Protocol version 6 (IPv6), Internet Protocol Security (IPsec), another Internet layer protocol, or a combination thereof. As such, the header information can include a source IP address, a destination IP address, a source port address, a destination port address, and a IP precedence value.

TABLE 1

Example of IP Precedence Values

| Precedence Value | Traffic Type |
| --- | --- |
| 0 (lowest) | Best Effort |
| 1 | Background |
| 2 | Standard (Spare) |
| 3 | Excellent Load (Business Critical) |
| 4 | Controlled Load (Streaming Media) |
| 5 | Voice and Video (Interactive Media and Voice) |
| 6 | Layer 3 Control (Reserved Traffic) |
| 7 (highest) | Layer 2 Control (Reserved Traffic) |

In a particular embodiment, ARs 112, 114, 116, and 118 grant priorities to packets based upon IP precedence values illustrated in Table 1. Thus, for example, if AR 112 receives a packet with a IP precedence value of "7," indicating that the packet includes layer 2 network control information, and also receives a packet with a IP precedence value of "0," indicating that the packet is characterized as "best effort" within the same forwarding "window", then AR 112 will prioritize the forwarding of the packet with IP precedence value 7 over the forwarding of the packet with IP precedence value 0. Further, during traffic congestion, if AR 112 is experiencing a high volume of higher priority traffic, the packet with IP precedence value 0 may be dropped by AR 112 if AR 112 does not have enough capacity to handle all of the higher priority traffic and the packet with IP precedence value 0.

In another embodiment, a similar scheme can be implemented using differentiated services code point (DSCP) values instead of IP precedence values. In yet another embodiment, in a multiprotocol label switching (MPLS) enabled network 110, the experimental (EXP) bits of the MPLS label can be used to implement such a scheme.

In another embodiment, ARs 112, 114, 116, and 118 include one or more virtual queues that manage the forwarding behavior in provider network 110. Here, when a packet is received, it is placed into one of the virtual queues based upon priority rules provided by policy server 130, as described below. Once packets are placed into the virtual queues, a configured scheduler algorithm is used to forward packets from each of the virtual queues. In a particular embodiment of a scheduler, a strict priority queue can be used to forward all packets from a high priority queue before forwarding packets from other queues. Fair queuing and weighted fair queuing are two other commonly used scheduling schemes.

In order to manage the forwarding behavior of provider network 110, ARs 112, 114, 116, and 118 send information that describes the current operational state of ARs 112, 114, 116, and 118 to network data server 120 via the network data links. Network data server 120 collects the operational information from ARs 112, 114, 116, and 118 and provides operational overview information to policy server 130 via the network data link. Policy server 130 evaluates the operational overview information and, applying policies and best practices, determines changes to the forwarding behavior of provider network 110. To implement the changes, policy server 130 sends router control information to ARs 112, 114, 116, and 118 via the network data links. In a particular embodiment, ARs 112, 114, 116, and 118 send operational data to network data server 120 using a sampling method. A non-limiting example of a sampling method includes sFlow data, Netflow data, cFlowd data, another sampling method or a combination thereof. In another embodiment (not illustrated), the functionalities of network data server 120 and policy server 130 are combined into a single network management server. In another embodiment, the functionalities of network data server 120 and policy server 130 are distributed across multiple network management servers.

Flash event traffic is unexpectedly heavy traffic within provider network 110, and can arise as a result of a distributed denial of service (DDoS) attack on provider network 110 or on Internet host 140, or as a result of an unforeseen peak in legitimate traffic on Internet host 140. The operational information from ARs 112, 114, 116, and 118 includes tallies of the number of packets entering each interface of the router with a given source and destination IP address, source and destination ports and a given protocol. The geographic origin of the packets and the time of day when these packets were received can be inferred from the location and time of day information of the particular AR that generated the flow data. If the operational information indicates that the volume of the traffic targeted to Internet host 140 is less than the link capacity between AR 118 and Internet host 140, then traffic flows in provider network 110 are adequately handled without special priority policies applied at AR 118. However, when the operational information indicates that the volume of the traffic targeted to Internet host 140 is greater than the link capacity, then a flash event is recognized and traffic flows in provider network 110 are handled using the priority rules. The operational information from one of ARs 112, 114, 116, or 118 may not indicate a flash event; however, the operational overview from network data server 120 can indicate a flash event since it can gauge the total traffic destined to host 140.

When policy server 130 identifies a flash event targeted to Internet host 140, policy server 130 identifies whether the event is the result of a DDoS attack, or the result of legitimate traffic. If the flash event is due to a DDoS attack, policy server 130 provides rules to ARs 112, 114, 116, and 118 that function to drop the attack traffic or to reroute all traffic destined to host 140 via a DDoS scrubbing node which will drop the attack traffic. In the case of a legitimate flash event, policy server 130 provides priority rules to AR 118 that function to selectively place the packets into one of the virtual queues for prioritized forwarding to Internet host 140. In a particular embodiment, the priority rules for a legitimate flash event are based directly upon the header information included in each packet. As such, the priority rules are based upon the source IP address, the source or destination port address, or the IP precedence or DSCP value. Thus, for example, the priority rules can direct packets that arrive from a particular range of IP addresses to be placed into a higher priority virtual queue in AR 118, or can direct that packets that are destined to a particular port to be placed into a lower priority virtual queue in AR 118.

In another embodiment, the priority rules for a legitimate flash event are based upon information derived from each packet handled by ARs 112, 114, 116, and 118. Thus, for example, the IP precedence or DSCP value can be set depending on the time of day each packet is received by ARs 112, 114, 116, and 118 as each packet arrives at provider network 110. Then the priority rules can direct packets that are received in a particular time range by a particular AR to be placed into a higher or lower priority virtual queue in AR 118. In another example, geographic location for the source of a packet is derived from the source IP address, on the assumption that IP addresses are loosely correlated with geographic locations. In another example, more precise geographic location can be derived from the IP options of the IP packet when such information is included in the IP options. Thus, the priority rules can direct packets that are received from a particular geographic location to be placed into a higher priority virtual queue in AR 118. In yet another example, the transport protocol of a packet can be determined, and priority rules can be created that direct packets based upon the transport protocol of the packet. Thus, packets that are received that use UDP can be placed into a higher or lower priority virtual queue in AR 118.

Thus, in a particular example, Internet host 140 provides a web-based commercial storefront for a retailer. If the retailer posts a sale for goods or services that generates greater traffic than the link between Internet host 140 and AR 118 can handle, then that condition can be determined by data server 120 from the data it receives from ARs 112, 114, 116 and 118. Policy server 130 will determine that the flash event consists of legitimate traffic, and will provide priority rules to AR 118 to handle the flash event. The forwarding behavior in AR 118 that results from the priority rules can be determined by the operator of provider network 110, or can be determined by the operator of Internet host 140 in cooperation with the operator of provider communications network 100. In the first instance, the operator of provider network 110 can select priority rules based upon efficiency or convenience considerations within provider network 110 and apply the priority rules to all flash events within provider network 110. In the second instance, the operator of Internet host 140 can give the operator of provider network 110 a pre-determined set of priority rules to use for flash events related to Internet host 140. For example, the retailer may seek to facilitate business transactions in favor of private transactions, and so may decide to de-prioritize private transactions received during business hours from a known set of source ip addresses and so prioritize based upon the time of day that a packet enters provider network 110 and the source ip address of the packet. After business hours, the retailer may seek to reverse the priority by giving private transaction higher priority during a predetermined time of day.

In another example, Internet host 140 provides a web-based governmental disaster coordination web site. A disaster in a particular geographic location might generate greater traffic than the link can handle, thus generating a flash event. Policy server 130 will provide priority rules to AR 118 to handle the flash event. Here, the operator of Internet host 140 can give a rapid response to the operator of provider network 110 directing that the priority rules for the flash event should give priority to requests from the geographic location of the disaster.

In another example, Internet host 140 provides a web-site for a popular performer. Some event may unexpectedly generate a flash event that primarily consists of e-mail traffic, as determined by the destination port of the incoming packets. The operator of provider network 110 may evaluate increases in e-mail traffic to determine if the traffic is a result of an increase in unsolicited bulk e-mail traffic or if it is legitimate. If the traffic is determined to be legitimate, the operator of provider network 110 can direct policy server 130 to send priority rules to AR 118 to give higher priority to e-mail traffic.

Figure 2:
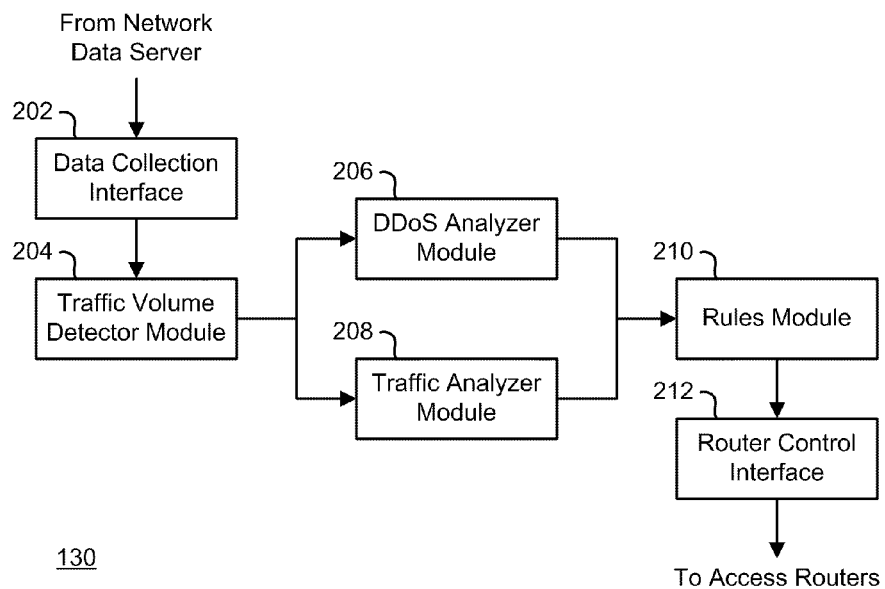
FIG. 2 is a block diagram of an embodiment of a policy server in the communications network of FIG. 1.

FIG. 2 illustrates an embodiment of a policy server 200, similar to policy server 130 and including a data collection interface 202, a traffic volume detection module 204, a DDoS analyzer module 206, a traffic analyzer module 208, a rules module 210, and a router control interface 212. Data collection interface 202 has an input and an output. Traffic volume detection module 204 has an input connected to the output of data collection interface 202 and an output. DDoS analyzer module 206 has an input connected to the output of traffic volume detection module 204 and an output. Traffic analyzer module 208 has an input connected to the output of traffic volume detection module 204 and an output. Rules module 210 has an input connected to the output of DDoS analyzer module 206 and to the output of traffic analyzer module 208, and an output. Router control interface has an input connected to the output of rules module 210 and an output.

Data collection interface 202 includes a bi-directional network data link to receive operational overview information from a network data server similar to network data server 120 on the input. Traffic volume detector module 204 receives the operational overview information and determines if the provider network is experiencing a flash event. In a particular embodiment, traffic volume detector module 204 has a table (not illustrated) that correlates the IP addresses within the provider network with the link capacity to each IP address. Then, when the operational overview information indicates that a particular IP address is experiencing a higher traffic volume than that IP address' link capacity can handle, traffic volume detector module 204 sends the information related to the particular IP address to DDoS analyzer module 206 and to traffic analyzer module 208. DDoS analyzer module 206 determines if the flash event is a DDoS attack, and if so, provides an indication to rules module 210 along with the information related to the particular IP address. Traffic analyzer module 206 determines if the flash event is a result of legitimate traffic, and if so, provides an indication to rules module 210 along with the information related to the particular IP address. Rules module 210 receives the output from DDoS analyzer module 206 and traffic analyzer module 208 and determines the response to the flash event. Rules module 210 communicates the response to the flash event to router control interface 212 which includes a bi-directional network data link to send router control information to access routers similar to ARs 112, 114, 116, and 118.

In a particular embodiment, rules module 210 includes the default priority rules for the provider network, whereby the provider network will handle flash events. Thus, for example, the rules module can determine if the flash event is localized in geography or in time, and can automatically prioritize targeted packets based upon that fact. In another embodiment, the provider network includes a client interface system which permits the operators of web hosts associated with the provider network to craft pre-determined rules based upon their unique needs. The client interface system provides the pre-determined rules to rules module 210. Then, when a flash event is targeted to a web host that has provided pre-determined rules, rules module 210 applies the pre-determined rules to the flash event. In another embodiment, the client interface system permits the operator of a web host to update their pre-determined rules to meet and ongoing flash event.

Figure 3:
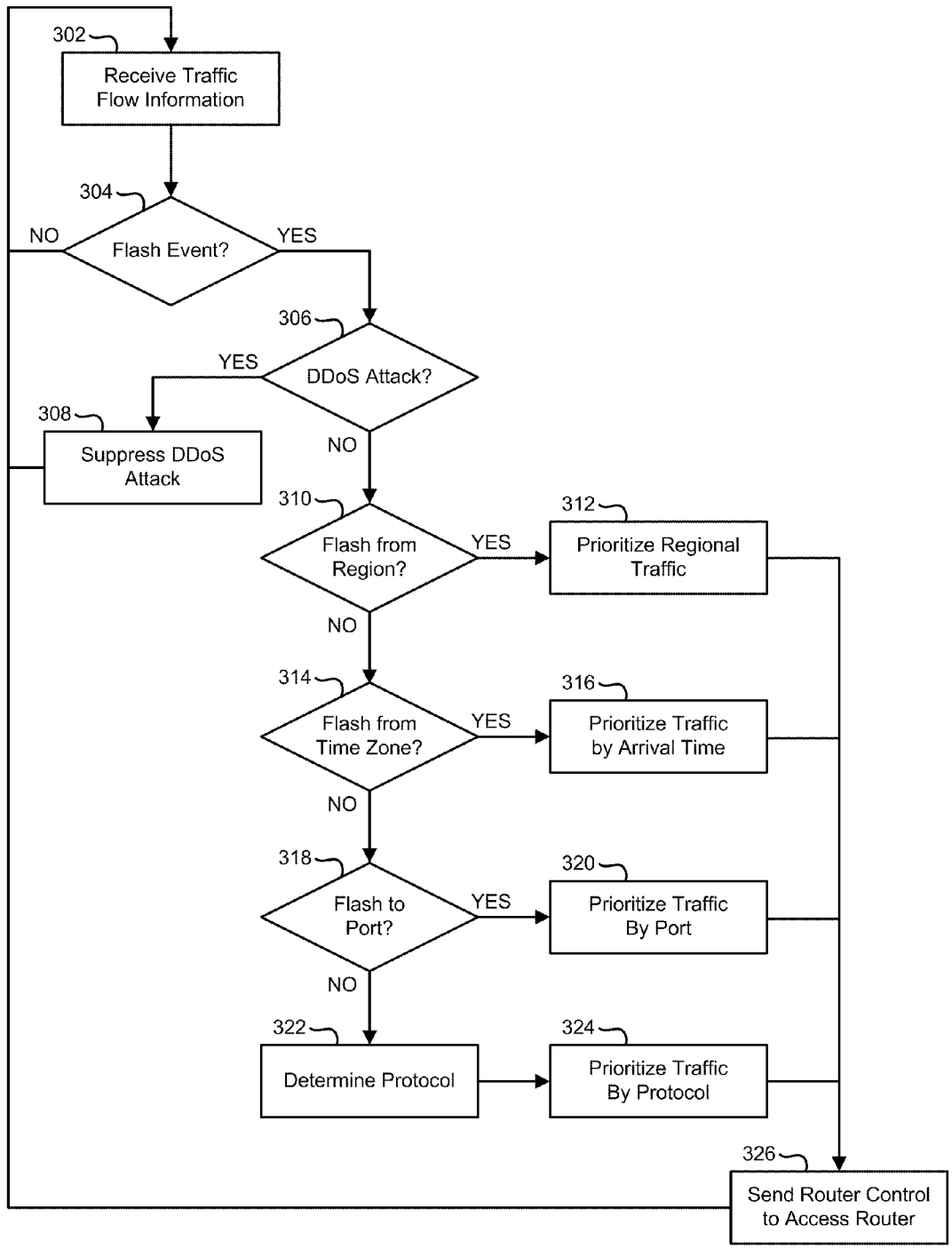
FIG. 3 is a flowchart illustrating an embodiment of a method for location, time-of-day, and quality-of-service based prioritized access control.

FIG. 3 is a flowchart illustrating an embodiment of a method for location, time-of-day, and quality-of-service based prioritized access control in a packet-switched network. The method starts in block 302 where traffic flow information is received. For example, a network data server can send operational overview information to data collection interface 202. A decision is made as to whether or not the traffic flow information indicates a flash event in decision block 304. For example traffic volume detector module 204 can determine if the provider network is experiencing a flash event. If not, the "NO" branch of decision block 304 is taken and processing returns to block 302 where traffic flow information is received. If the traffic flow information indicates a flash event, then the "YES" branch of decision block 304 is taken and a decision is made as to whether or not the flash event is a DDoS attack in decision block 306. Thus information related to the flash event can be sent to DDoS analyzer module 206 to determine if the flash event is a DDoS attack. If so, the "YES" branch of decision block 306 is taken, the DDoS attack is flash traffic that should be suppressed in block 308, and processing returns to block 302 where traffic flow information is received. For example, DDoS analyzer module 206 can determine that the provider network is experiencing a DDoS attack and can indicate so to rules module 210. Rules module 210 can then take appropriate measures to modify the behavior of the access routers in the provider network.

If the flash event is not a DDoS attack, the "NO" branch of decision block 306 is taken and a decision is made as to whether or not the flash event is associated with a particular region in decision block 310. For example, traffic analyzer module 208 can determine that the provider network is experiencing a legitimate flash event and can indicate so to rules module 210. If so, the "YES" branch of decision block 310 is taken, the traffic from the particular region is prioritized in block 312, router control information is sent to the relevant access router in block 326, and processing returns to block 302 where traffic flow information is received. For example, traffic analyzer module 208 can determine that the provider network is experiencing a legitimate flash event from a particular region and can indicate so to rules module 210. Rules module 210 then sends appropriate router control information to router control interface 212 to be forwarded to the relevant access router.

If the flash is not associated with a particular region, the "NO" branch of decision block 310 is taken and a decision is made as to whether or not the flash event is received by the provider network at a particular time of day or from a particular time zone in decision block 314. If so, the "YES" branch of decision block 314 is taken, the traffic from the received at the particular time of day, or from the particular time zone is prioritized in block 316, router control information is sent to the effected access router in block 326, and processing returns to block 302. For example, traffic analyzer module 208 can determine that the flash event is occurring at a particular time of day and can indicate so to rules module 210 that sends appropriate router control information to router control interface 212 to be forwarded to the relevant access router.

If the flash is not received by the provider network at a particular time of day or from a particular time zone, the "NO" branch of decision block 314 is taken and a decision is made as to whether or not the flash event is targeted to a particular port in decision block 318. If so, the "YES" branch of decision block 318 is taken, the traffic targeted to the particular port is prioritized in block 320, router control information is sent to the effected access router in block 326, and processing returns to block 302. For example, traffic analyzer module 208 can determine that the flash event is targeted to a particular port and can indicate so to rules module 210 that sends appropriate router control information to router control interface 212 to be forwarded to the relevant access router. If the flash event is not targeted to a particular port, the "NO" branch of decision block 318 is taken, the protocol of traffic associated with the flash event is determined in block 322, the traffic of the particular protocol is prioritized in block 324, router control information is sent to the relevant access router in block 326, and processing returns to block 302. For example, traffic analyzer module 208 can determine that the flash event consists of an increase in traffic of a particular protocol and can indicate so to rules module 210 that sends appropriate router control information to router control interface 212 to be forwarded to the relevant access router.

Figure 4:
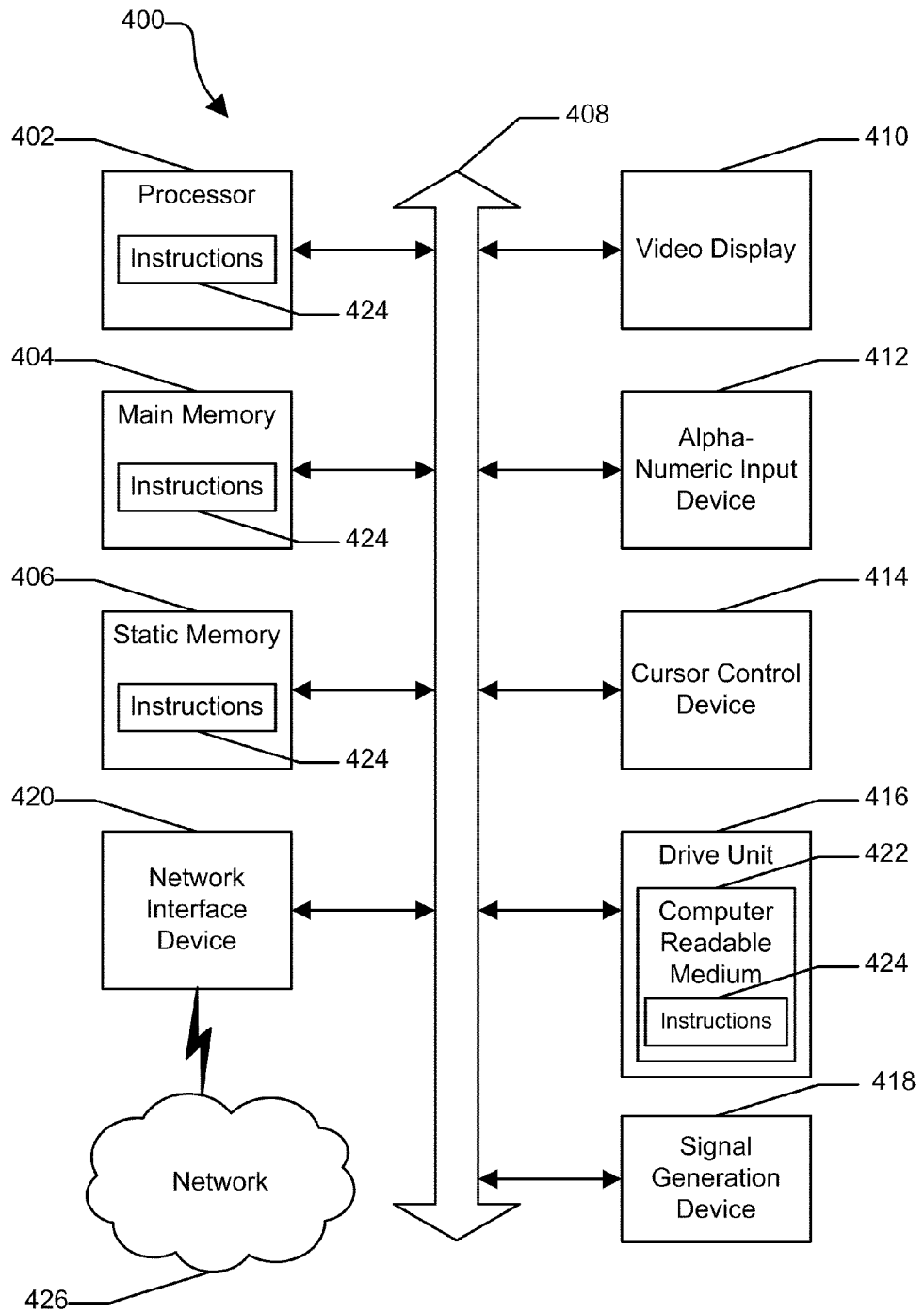
FIG. 4 is a block diagram showing an illustrative embodiment of a general computer system.

FIG. 4 shows an illustrative embodiment of a general computer system 400 in accordance with at least one embodiment of the present disclosure. Computer system 400 includes a set of instructions that can be executed to cause computer system 400 to perform any one or more of the methods or computer based functions disclosed herein. Computer system 400 can operate as a standalone device or can be connected via a network to other computer systems or peripheral devices.

In a networked deployment, computer system 400 operates in the capacity of a server or as a client computer in a server-client network environment, or as a peer computer system in a peer-to-peer (or distributed) network environment. Computer system 400 can also be implemented as or incorporated into various devices, such as a personal computer (PC), a tablet PC, a set-top box, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, computer system 400 is implemented using electronic devices that provide voice, video or data communication. Further, while computer system 400 is illustrated as a single system, the term "system" shall also be taken to include any collection of systems or sub-systems that individually or jointly execute a set, or multiple sets, of instructions to perform one or more computer functions.

Computer system 400 includes a processor 402 such as a central processing unit (CPU), a graphics processing unit (GPU), or both. Moreover, computer system 400 includes a main memory 404 and a static memory 406 that communicate with each other via a bus 408. Computer system 400 further includes a video display unit 410, such as a liquid crystal display (LCD), an organic light emitting diode (OLED), a flat panel display, a solid state display, or a cathode ray tube (CRT). Additionally, computer system 400 includes an input device 412, such as a keyboard, and a cursor control device 414, such as a mouse. Computer system 400 also includes a disk drive unit 416, a signal generation device 418, such as a speaker or remote control, and a network interface device 420.

In a particular embodiment, disk drive unit 416 includes a computer-readable medium 422 in which one or more sets of instructions 424 are embedded. Instructions 424 embody one or more of the methods or logic as described herein. In a particular embodiment, instructions 424 reside completely, or at least partially, within main memory 404, static memory 406, and/or within processor 402 during execution by computer system 400. Main memory 404 and processor 402 also include computer-readable media. Network interface device 420 provides connectivity to a network 426 such as a wide area network (WAN), a local area network (LAN), or other network. The present disclosure contemplates a computer-readable medium that includes instructions 424 or receives and executes instructions 424 responsive to a propagated signal so that a device connected to network 426 can communicate voice, video or data over network 426. Further, instructions 424 can be transmitted or received by network 426 via network interface device 420.

In an alternative embodiment, dedicated hardware implementations such as application specific integrated circuits, programmable logic arrays and other hardware devices can be constructed to implement one or more of the methods described herein. Applications that include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software code executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A priority server for a provider network, comprising:
    a traffic volume detection module that receives operational information from the provider network and determines that a host on the provider network is experiencing a flash event based upon the operational information;
    a traffic analyzer module that determines that the flash event is not a distributed denial of service attack on the host; and
    a rules module that provides a priority rule to an access router in the provider network that is coupled to the host in response to determining that the flash event is not a distributed denial of service attack, wherein:
        the priority rule is based upon a characteristic of packets routed in the provider network that are associated with the flash event; and
        the characteristic is determined not solely by information included in the packets.

2. The priority server of claim 1, wherein the characteristic includes a geographic location that is a source of the packets.

3. The priority server of claim 1, wherein the characteristic includes a time at which the packets entered the provider network.

4. The priority server of claim 3, wherein the time includes a time zone.

5. The priority server of claim 3, wherein the time includes a range of times.

6. The priority server of claim 1, wherein the characteristic includes a port of the host that is a target of the packets.

7. The priority server of claim 1, wherein the characteristic includes a particular network protocol that is associated with the packets.

8. A method of prioritizing traffic in a provider network, comprising:
    receiving at a traffic volume detection module of a priority server operational information from the provider network;
    determining that a host on the provider network is experiencing a flash event based upon the operational information;

determining that the flash event is not a distributed denial of service attack on the host; and in response to determining that the flash event is not a distributed denial of service attack, providing a priority rule to an access router in the provider network that is coupled to the host, wherein:

the priority rule is based upon a characteristic of packets routed in the provider network that are associated with the flash event; and the characteristic is determined not solely by information included in the packets.

9. The method of claim 8, wherein the characteristic includes a geographic location that is a source of the packets.

10. The method of claim 8, wherein the characteristic includes a time at which the packets entered the provider network.

11. The method of claim 10, wherein the time includes a time zone.

12. The method of claim 11, wherein the time includes a range of times.

13. The method of claim 8, wherein the characteristic includes a port of the host that is a target of the packets.

14. The method of claim 8, wherein the characteristic includes a particular network protocol that is associated with the packets.

15. Machine-executable code for managing prioritized access rules, wherein the machine-executable code is embedded within a non-transitory medium and includes instructions for carrying out a method comprising:

receiving operational information from a provider network;

determining that a host on the provider network is experiencing a flash event based upon the operational information;

determining that the flash event is not a distributed denial of service attack on the host; and in response to determining that the flash event is not a distributed denial of service attack, providing a priority rule to an access router in the provider network that is coupled to the host, wherein:

the priority rule is based upon a characteristic of packets routed in the provider network that are associated with the flash event; and the characteristic is determined not solely by information included in the packets.

16. The machine-executable code of claim 15, wherein the characteristic includes a geographic location that is a source of the packets.

17. The machine-executable code of claim 15, wherein the characteristic includes a time at which the packets entered the provider network.

18. The machine-executable code of claim 17, wherein the time includes a time zone.

19. The machine-executable code of claim 15, wherein the characteristic includes a port of the host that is a target of the packets.

20. The machine-executable code of claim 15, wherein the characteristic includes a particular network protocol that is associated with the packets.

* * * * *